United States Patent
Tachibana

[11] Patent Number: 5,898,440
[45] Date of Patent: Apr. 27, 1999

[54] METHOD OF AND APPARATUS FOR PROCESSING GRAPHICS DATA

[75] Inventor: Kazuhiko Tachibana, Kanagawa-ken, Japan

[73] Assignee: Kabushiki Kaisha Toshiba, Kawasaki, Japan

[21] Appl. No.: 08/941,000

[22] Filed: Sep. 30, 1997

[30] Foreign Application Priority Data

Sep. 30, 1996 [JP] Japan .................... 8-259035

[51] Int. Cl.$^6$ .................................... G06F 15/00
[52] U.S. Cl. ............................. 345/443
[58] Field of Search ................. 345/443, 440, 345/441, 442, 435, 113, 114, 138, 148, 149

[56] References Cited

U.S. PATENT DOCUMENTS 5,528,738  6/1996  Sfarti et al. ........................ 395/143
5,581,673  12/1996  Kikuchi ............................. 395/123
5,714,986  2/1998  Dao .................................. 345/443

*Primary Examiner*—Phu K. Nguyen
*Attorney, Agent, or Firm*—Foley & Lardner

[57] ABSTRACT

A data processor and a data processing method are capable of effectively carrying out antialiasing on a plurality of lines that are close to each other or cross each other. The apparatus has a memory for storing a bitmap of a line to be displayed on a display, and a data generator for generating, according to antialiasing conditions, data of every pixel to be plotted to form the line. The data includes an address to specify the pixel and one of intensity and color values to be assigned as a new value to the pixel. The apparatus also has a reader for reading, as an old value, one of intensity and color values that corresponds to the new value and has already been assigned to the pixel, out of the memory at the address of the pixel, and a comparator for comparing the new value with the old value, and only when the new value is greater than the old one, providing a write signal. Only when the write signal is provided, the new value is written into the memory at the address of the pixel.

11 Claims, 14 Drawing Sheets

FIG.2
PRIOR ART

```
S111 ----▶   line plot()
             {
S112 ----▶       dx = (X1-X0)    ;
S113 ----▶       dy = (Y1-Y0)    ;
S114 ----▶       deltaY = dy/dx  ;
S115 ----▶       X = X0          ;
S116 ----▶       Y = Y0          ;
S117 ----▶       dM = 0.5        ;
S118 ----▶       I = intencity   ;
S119 ----▶       for ( ; X <= X1 ; X = X + 1 )
                 {
S120 ----▶           pixcel plot ( X , Y , I ) ;
S121 ----▶           dM = dM + deltaY ;
S122 ----▶           if ( dM > 1 )
                     {
S124 ----▶               Y = Y + 1     ;
S125 ----▶               dM = dM - 1  ;
                     }
                 }
             }
```

FIG.3A
PRIOR ART
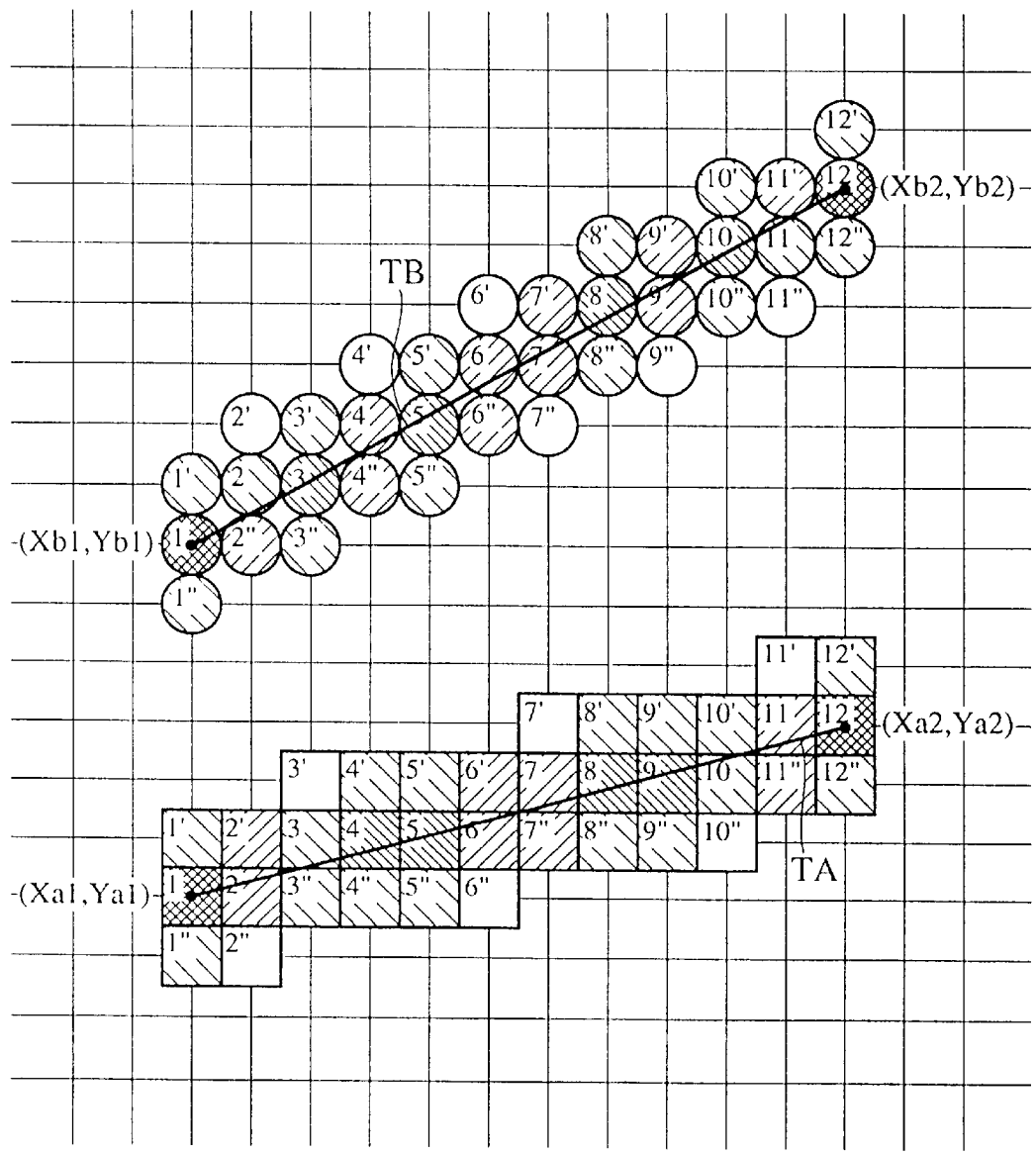
FIG.3B
PRIOR ART
○ : PIXEL OF STRAIGHT LINE TB
□ : PIXEL OF STRAIGHT LINE TA
FIG.3C
PRIOR ART
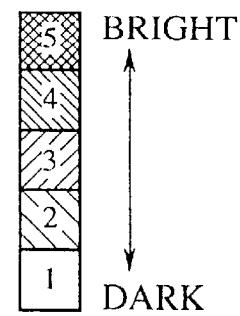
BRIGHT
DARK

FIG.8

```
S11----→  line_plot()
          {
S12----→      dx = (X1-X0) ;
S13----→      dy = (Y1-Y0) ;
S14----→      deltaY = dy/dx ;
S15----→      X = X0 ;
S16----→      Y = Y0 ;
S17----→      dM = 0.5 ;
S18----→      I = I0 ;

S19----→      for ( ; X <= X1 ;    X = X + 1 )
              {
S20----→          pixcel_plot ( X , Y+1 , I0 * f ( dM , Y+1 ) ) ;
S21----→          pixcel_plot ( X , Y   , I0 * f ( dM , Y   ) ) ;
S22----→          pixcel_plot ( X , Y-1 , I0 * f ( dM , Y-1 ) ) ;
S23----→          dM = dM + deltaY ;
S24----→          if ( dM > 1 )
                  {
S25----→              Y = Y + 1 ;
S26----→              dM = dM - 1 ;
                  }
              }
          }
```

FIG.13

```
S31----▸  line_plot()
          {
S32----▸      dx = (X1-X0)       ;
S33----▸      dy = (Y1-Y0)       ;
S34----▸      deltaY = dy/dx     ;
S35----▸      X = X0
S36----▸      Y = Y0
S37----▸      dM = 0.5
S38----▸      I = I0

S39----▸      for( ; X < = X1 ; X = X + 1 )
              {
S40----▸          if ( dM > = 0 ) {
S41----▸              pixcel_plot( X , Y , I0 * f ( dM , Y+1 )      ;
S42----▸              pixcel_plot( X , Y+1 , I0 * f ( 1.0-dM , Y+1 ) )    ;
S43----▸          } else {
S44----▸              pixcel_plot( X , Y , I0 * f ( dM , Y+1 ) )    ;
S45----▸              pixcel_plot( X , Y-1 , I0 * f ( 1.0+dM , Y-1 ) )   ;
                  }
S46----▸          dM = dM + deltaY ;
S47----▸          if ( dM > 1 )
                  {
S48----▸              Y = Y + 1   ;
S49----▸              dM = dM - 1;
                  }
              }
          }
```

FIG.14A
FIG.14B
□ : PIXEL OF STRAIGHT LINE TA
FIG.14C
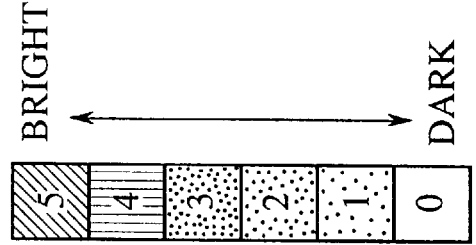
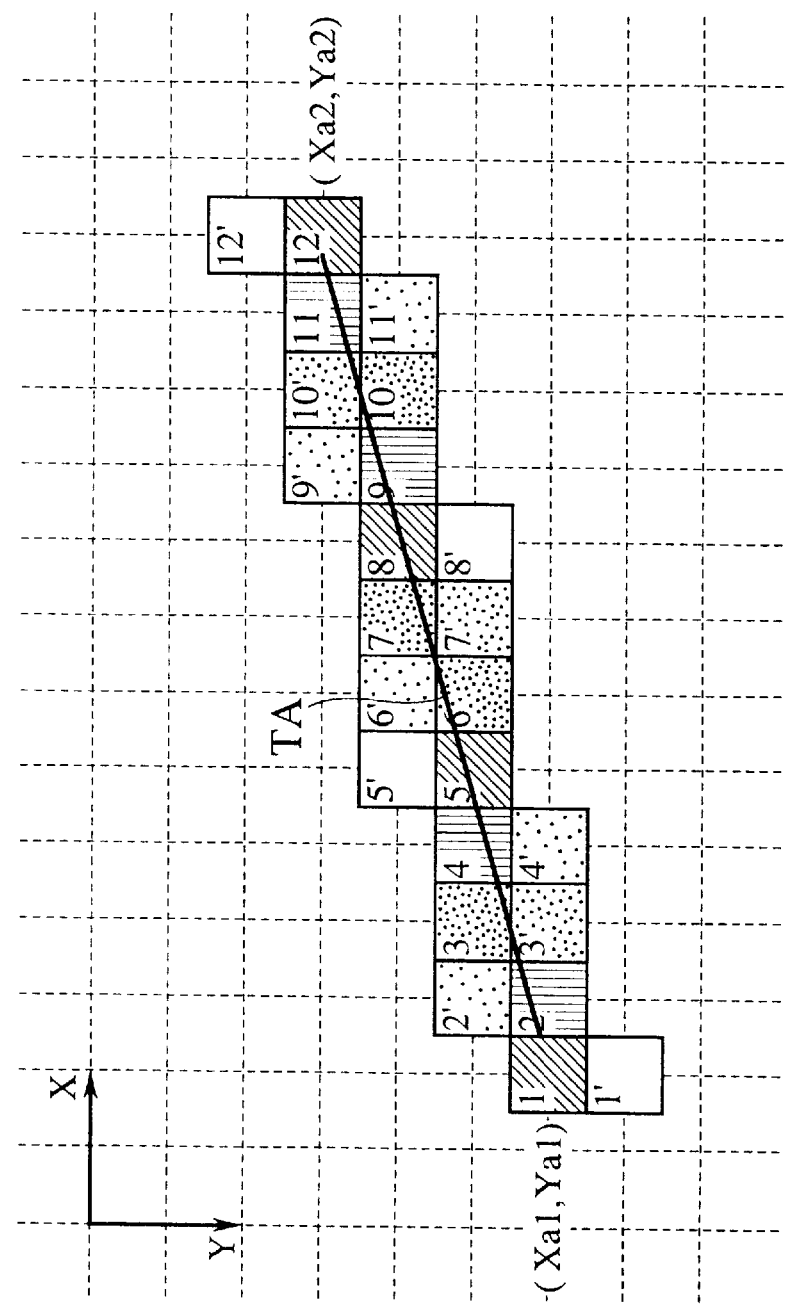

METHOD OF AND APPARATUS FOR PROCESSING GRAPHICS DATA

BACKGROUND OF THE INVENTION

1. Field of the Invention

The present invention relates to a graphics data processing technique such as computer graphics, and particularly, to a method of and an apparatus for processing graphics data and drawing lines with antialiasing.

2. Description of the Prior Art

FIG. 1 shows a straight line drawn from coordinates (X0, Y0) to coordinates (X1, Y1) by a digital differential analyzer (DDA) according to a prior art. In the figure, an abscissa corresponds to an X-axis, an ordinate to a Y-axis, dotted grid lines to coordinate lines, and each hatched square to a pixel. The straight line is formed by plotting pixels 1 to 12 in this order.

A known algorithm used to draw a straight line of this kind is Bresenham algorithm. FIG. 2 shows a C-language-like description of the Bresenham algorithm for drawing the straight line of FIG. 1.

In FIG. 2, Step S111 starts to draw the line. Step S112 sets a variation in X. Step S113 sets a variation in Y. Step S114 sets a unit variation in Y with respect to X.

Step S115 sets an initial X-coordinate. Step S11B sets an initial Y-coordinate. Step S117 sets an initial value of 0.5 for a distance dM from a pixel center to the center of the line. Step S118 sets an intensity I for each pixel.

Then, the line is generated. Namely, step S119 increments X from X0 to X1. During this incremental operation, step S120 plots a pixel at coordinates (X, Y) with the intensity I, step S121 accumulates delta-Y as dM, and step S122 checks to see if dM>1. If dM>1, step S123 increments Y by +1 and step S124 resets dM.

The Bresenham algorithm is easy to implement with the DDA.

The straight line drawn according to the Bresenham algorithm, however, involves stepwise jaggy, if the line is diagonal as shown in FIG. 1. A technique of removing such jaggy is antialiasing. A method of carrying out antialiasing on a straight line is disclosed in, for example, "Filtering Edges for Gray-Scale Displays" by Gupta Sproull, Computer Graphics, Vol. 15, No. 3, August, 1981.

Generally, the DDA draws a straight line pixel by pixel as shown in FIG. 1. Instead, the technique disclosed in the above document draws a straight line with three shaded pixels at a time. Namely, the technique provides a straight line with a width of three pixels with the central one having a higher intensity value and boundary ones having lower intensity values. As a result, intensity differences along the boundaries of the straight line become less distinct, thereby removing jaggy as shown in FIG. 3A.

In FIG. 3A, a straight line TA is drawn from coordinates (Xa1, Ya1) to coordinates (Xa2, Ya2), and a straight line TB from (Xb1, Yb1) to (Xb2, Yb2) with each straight line being oblique. Pixels used to draw the line TA are represented with squares as shown in FIG. 3B, and those for the line TB with circles as shown in the same figure. Each pixel may have any one of five intensity values as shown in FIG. 3C. A number depicted in a given pixel in FIG. 3A indicates drawing order. Pixels having the same number with or without quotation marks are simultaneously drawn. For example, pixels 1, 1', and 1" are drawn at the same time with different intensity values.

FIG. 4 shows a graphics data processor according to a prior art, for drawing straight lines such as those shown in FIGS. 1 and 3A.

The processor has a microprocessor unit (MPU) 111 for providing parameters of a straight line to draw, a digital differential analyzer (DDA) 112 for generating the straight line according to antialiasing conditions, a frame buffer (VRAM) 113 for storing the straight line, a CRT 114 for displaying the straight line read out of the frame buffer 113, and a CRT controller 115 for controlling the CRT 114.

When drawing a plurality of straight lines, the antialiasing technique disclosed in the document mentioned above raises a problem. This problem will be explained with reference to FIG. 5.

In FIG. 5, a straight line TA is drawn first, and then, a straight line TB is drawn close to the line TA so that antialiasing pixels of the lines TA and TB overlap each other. The shapes and intensity values of the pixels of FIG. 5 are the same as those of FIGS. 3B and 3C.

In FIG. 5, pixels of the lines TA and TB overlap one another in a zone P surrounded with a thick line. Since the line TB is drawn after the line TA, the pixels of the line TB in the zone P are drawn over the corresponding pixels of the line TA. If the intensity difference between the pixels of the lines TA and TB in the zone P is large, the antialiasing will be incorrect and provide unnatural images of the lines TA and TB in the zone P.

For example, if a shaded pixel B3" of the line TB is darker than a shaded pixel A2' of the line TA on which the pixel B3" is drawn, the lines TA and TB will show unnatural images at there. This problem also occurs on lines that cross each other.

SUMMARY OF THE INVENTION

An object of the present invention is to provide a method of and an apparatus for correctly carrying out antialiasing even on straight lines that are close to each other or cross each other.

Another object of the present invention is to provide a method of and an apparatus for correctly carrying out antialiasing on straight lines at high speed.

In order to accomplish the objects, the present invention provides a data processor having a memory for storing a bitmap of a figure to be displayed on a display and a data generator for generating, according to antialiasing conditions, data of every pixel to be plotted to form the figure. This data includes an address to specify the pixel and one of intensity and color values to be assigned as a new value to the pixel. The data processor further has a reader and a comparator. The reader reads, as an old value, one of intensity and color values that corresponds to the new value and has already been assigned to the pixel, out of the memory at the address of the pixel. The comparator compares the new and old values with each other, and only when the new value is greater than the old one, provides a write signal. Only when the write signal is provided, the new value is written into the memory at the address of the pixel.

Consequently, the present invention always plots a brighter one of pixels that overlap each other when drawing a plurality of straight lines that are close to each other or cross each other, thereby providing natural images of the lines. The present invention may directly provide the comparator with new and old intensity data for a given pixel, to improve a processing speed.

According to an aspect of the present invention, the data generator generates addresses and new intensity or color values for vertical or horizontal three pixels at a time to draw a given figure, the new values being adjusted according to antialiasing conditions.

When drawing a plurality of lines, this aspect provides a natural image of each line even if the lines are close to each other or cross each other.

According to another aspect of the present invention, the data generator generates addresses and new intensity or color values for vertical or horizontal two pixels at a time to draw a given figure, the new values being adjusted according to antialiasing conditions. When drawing a plurality of lines, this aspect provides a natural image of each line even if the lines are close to each other or cross each other.

Still another aspect of the present invention provides a data processor having a memory for storing a bitmap of a figure to be displayed on a display, an intensity/color value generator for generating data of every pixel to be plotted to form the figure, the data including an address to specify the pixel and one of intensity and color values to be assigned as a new value to the pixel, a draw unit for drawing the new value in the memory at the address of the pixel, and a changer for changing the new value to be drawn by the draw unit according to antialiasing conditions. The data processor further has a reader and a comparator. The reader reads, as an old value, one of intensity and color values that corresponds to the changed new value and has already been assigned to the pixel, out of the memory at the address of the pixel. The comparator compares the changed new value with the old value, and only when the changed new value is greater than the old one, provides a write signal. Only when the write signal is provided, the changed new value is written into the memory at the address of the pixel.

When the intensity/color value generator, draw unit, and changer draw a plurality of lines according to antialiasing conditions, the reader and comparator always write a brighter pixel at a location where the lines are close to each other or cross each other, thereby providing natural images of the lines.

Still another aspect of the present invention provides a data processor having a primary memory for storing a bitmap of a figure to be displayed on a display, an intensity/color value generator for generating data of every pixel to be plotted to form the figure, the data including an address to specify the pixel and one of intensity and color values to be assigned as a new value to the pixel, a draw unit for drawing the new value in the primary memory at the address of the pixel, and a changer for changing the new value to be drawn by the draw unit according to antialiasing conditions. The data processor further has a first memory for storing the changed new value, a second memory for storing an old value that corresponds to the changed new value, has already been assigned to the pixel, and read out of the primary memory at the address of the pixel, and a comparator for comparing the changed new value in the first memory with the old value in the second memory and providing a write signal only when the changed new value is greater than the old value. Only when the write signal is provided, the changed new value is written into the primary memory.

In this way, the first memory stores a new intensity or color value of a given pixel, and the second memory stores an old intensity or color value of the same pixel. Accordingly, the comparator correctly compares the new and old values stored in the first and second memories with each other. Even when drawing a plurality of lines that are close to each other or cross each other, this aspect of the present invention surely carries out antialiasing on the lines and provides natural images thereof.

The comparator may compare, for each pixel, new and old color values with each other and may have first, second, and third comparators to compare new and old red, green, and blue values, respectively, with each other. The comparator also has a majority circuit for generating a write signal according to a majority of comparison results provided by the first to third comparators. This arrangement is capable of handling pixels having color values.

The intensity/color value generator may generate addresses and new intensity or color values for vertical or horizontal three pixels at a time to draw a line.

This arrangement is capable of providing natural images of lines that are close to each other or cross each other.

The intensity/color value generator may generate addresses and new intensity or color values for vertical or horizontal two pixels at a time to draw a line.

This arrangement is capable of providing natural images of lines that are close to each other or cross each other.

The present invention also provides a data processing method including the steps of generating data of every pixel to be plotted to form a straight line according to antialiasing conditions, and drawing the straight line according to the generated data. If the straight line crosses another line, any pixel existing at the intersection is drawn with a maximum one of intensity or color values assigned to the pixel.

The present invention also provides a data processing method including the steps of generating data of every pixel to be plotted to form a curve according to antialiasing conditions, and drawing the curve according to the generated data. If the curve crosses another line, any pixel existing at the intersection is drawn with a maximum one of intensity or color values assigned to the pixel.

BRIEF DESCRIPTION OF THE DRAWINGS

FIG. 2 shows an algorithm in a C-language-like description, for drawing the straight line of FIG. 1;

FIGS. 3A to 3C show straight lines drawn with antialiasing according to a prior art;

FIG. 8 shows an algorithm in a C-language-like description, according to the first embodiment;

FIG. 13 shows an algorithm in a C-language-like description, according to a third embodiment of the present invention; and FIGS. 14A to 14C show a straight line drawn according to the third embodiment.

DETAILED DESCRIPTION OF THE EMBODIMENTS

The embodiments of the present invention will be explained with reference to the drawings.

Figure 6:
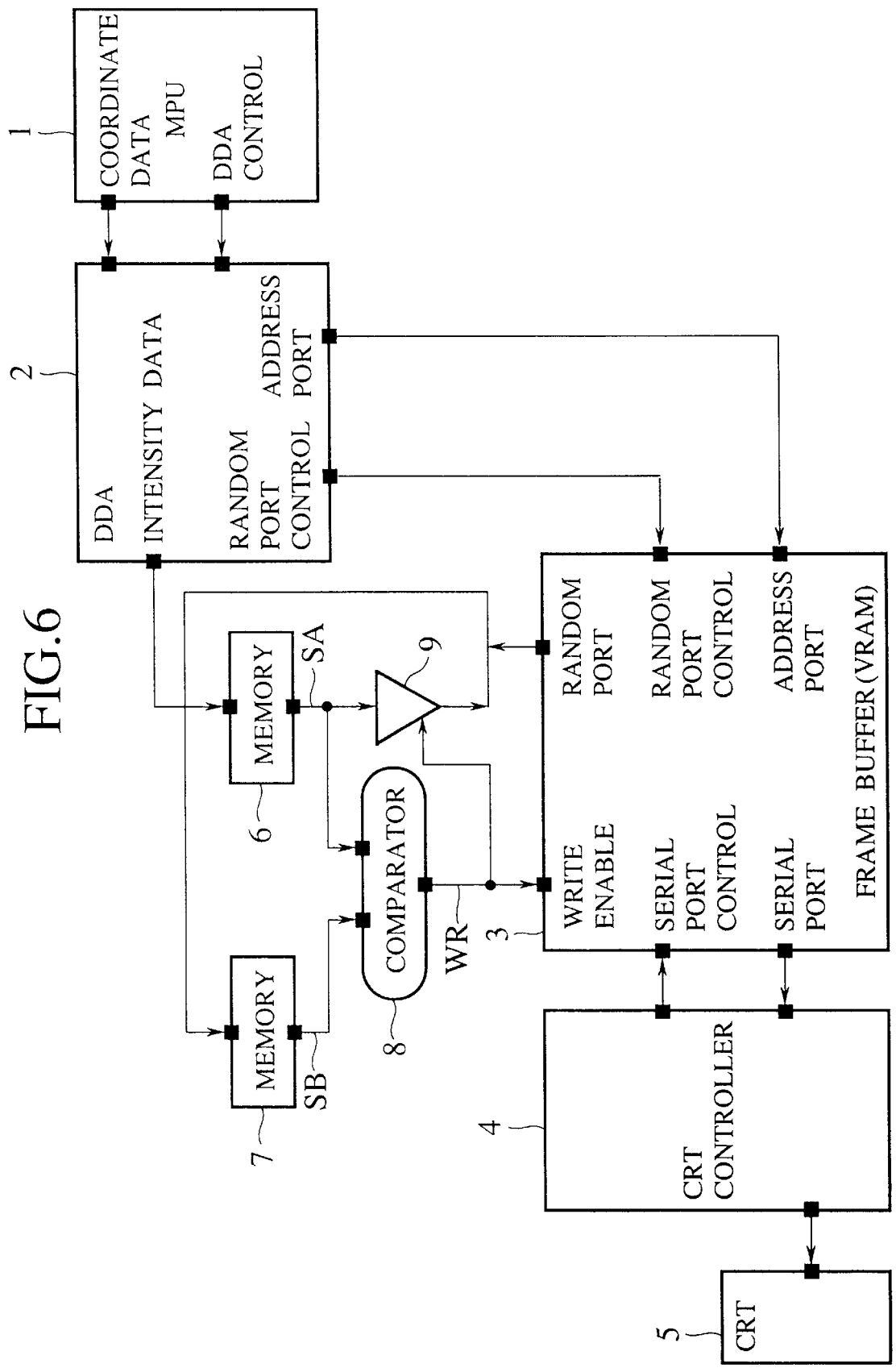
FIG. 6 shows the basic structure of a data processor according to a first embodiment of the present invention.

FIG. 6 shows the basic structure of a graphics data processor according to the first embodiment of the present invention. The processor has a microprocessor unit (MPU) 1 for providing parameters such as coordinates to draw a line, a digital differential analyzer (DDA) 2, a frame buffer (VRAM) 3, a CRT controller 4, and a CRT 5.

The DDA 2 receives the parameters and a drawing instruction, generates line data according to antialiasing conditions, and draws the line in a bitmap in the frame buffer 3. More precisely, the DDA 2 has a unit for generating the address and intensity value of each of pixels that are plotted to form the line between start and end points in the bitmap in the frame buffer 3, a unit for storing the generated intensity value of each pixel in the frame buffer 3 at an address corresponding to the pixel, and a unit for changing the intensity value of each pixel according to antialiasing conditions.

These units of the DDA 2 follow an algorithm shown in FIG. 8 to be explained later. The DDA 2 provides the generated data and addresses directly to the frame buffer 3 through ports.

The frame buffer 3 stores, in the bitmap, the line to display on the CRT 5 and has a capacity of, for example, 1280×1024 pixels. Memories 6 and 7 and a comparator 8 are characteristic to the present invention and are arranged between the DDA 2 and the frame buffer 3.

The memory 6 is, for example, a register to receive the intensity value of each pixel to be plotted, from the DDA 2 and temporarily store the same. The memory 7 is, for example, a register to read the intensity value of each pixel that has been plotted, out of the frame buffer 3 and stores the same.

Figure 7:
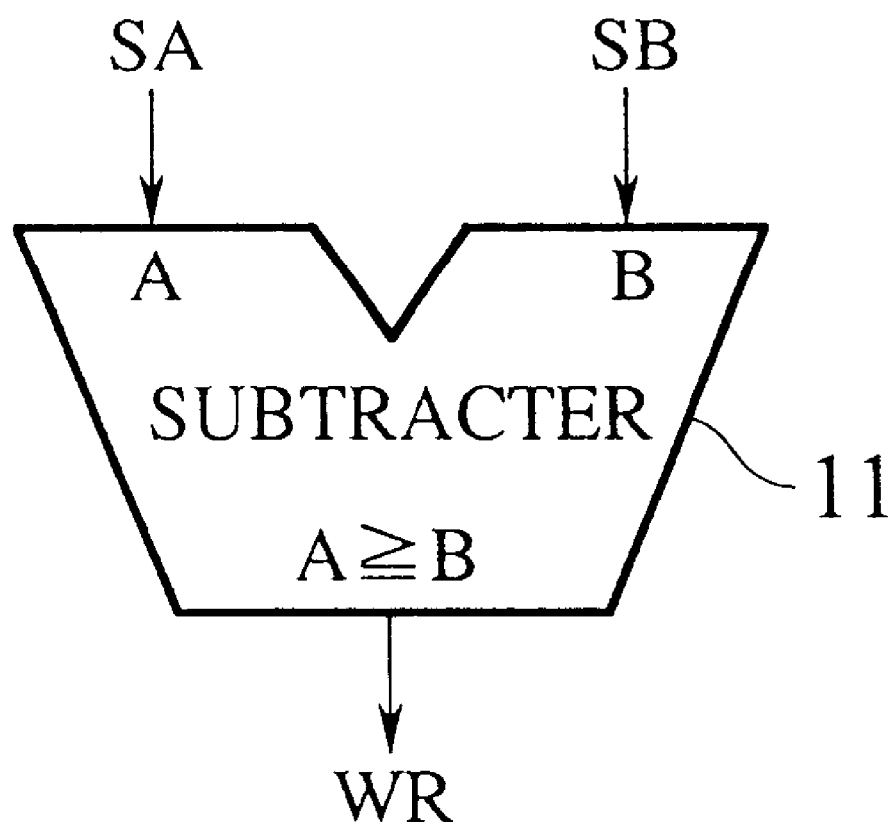
FIG. 7 shows an example of a comparator 8 of FIG. 6.

The comparator 8 has, for example, a structure shown in FIG. 7 that is for gray scales that involve only intensity values and no color values. The comparator 8 compares an intensity value SA that is to be written on a given pixel and is read out of the memory 6 with an intensity value SB that has already been written on the given pixel and is read out of the memory 7. Only when SA is greater than SB, the comparator 8 activates a write signal WR, which is supplied to a write enable terminal of the frame buffer 3. In response to this signal, the frame buffer 3 receives the intensity value SA from the memory 6 through a tri-state buffer 9 and stores it in itself at a corresponding address.

The CRT controller 4 controls a serial port of the frame buffer 3 and displays the line stored in the bitmap of the frame buffer 3 on the CRT 5.

FIG. 7 shows an example of the comparator 8.

The comparator 8 of FIG. 7 consists of a subtracter 11 having an input terminal A to receive, from the memory 6, an intensity value SA to be drawn and an input terminal B to receive, from the memory 7, an intensity value SB already drawn. If SA>=SB, the comparator 8 provides "1" to activate the write signal WR, and if SA<SB, "0" to inactivate the write signal WR.

FIG. 8 shows an algorithm in a C-language-like description, for carrying out antialiasing on a given line with the use of three pixels at a time. This algorithm is executed by the DDA 2.

The algorithm of FIG. 8 draws, for example, a straight line from coordinates (X0, Y0) to coordinates (X1, Y1) with an intensity value of I0. The intensity value of a given pixel to be plotted is a function f of dM, dx, dy, etc. The function "f" is determined according to antialiasing conditions. In this example, the intensity value I of a given pixel is determined as "I0*f(dM, Y)."

In FIG. 8, step S11 starts to draw the line with antialiasing. Step S12 sets a variation dx as "X1-X0." Step S13 sets a variation dy as "Y1-Y0." Step S14 sets a unit variation delta-Y as "dy/dx." Step S15 sets an initial X-coordinate as X0. Step S16 sets an initial Y-coordinate as Y0. Step S17 sets an initial value of 0.5 for a distance dM from a pixel center to the center of the straight line. Step S18 sets a basic pixel intensity as I0.

Then, the straight line is generated. Namely, step S19 increments X from X0 to X1. During this incremental operation, antialiasing with three pixels per point takes place. Namely, step S20 plots a pixel at coordinates (X, Y+1) with an intensity I, step S21 plots a pixel at coordinates (X, Y) with an intensity I, step S22 plots a pixel at coordinates (X, Y-1) with an intensity I, step S23 accumulates delta-Y, and step S24 checks to see if dM>1. If dM>1, step S25 increments Y by +1, and step S26 resets dM. In this way, drawing a straight line with antialiasing is basically realized by combining the function "f" for obtaining intensity values with the technique of drawing a straight line without antialiasing shown in FIG. 2. Implementing the antialiasing algorithm in hardware must carefully be carried out because it complicates and enlarges hardware. The function "f" to determine intensity values differs depending on antialiasing conditions. For example, a function based on the Gupta Sproull method involves root and multiplication operations. In this case, tables may be employed to simplify the operations.

The operation of the embodiment will be explained.

The MPU 1 provides the DDA 2 with the start and end coordinates and intensity value of a straight line to draw and a drawing start signal. Upon receiving them, the DDA 2 generates the X-Y coordinates and intensity values of pixels to plot.

First, the DDA 2 writes a new intensity value to be assigned to a given pixel into the memory 6. At the same time, the DDA2 provides the frame buffer 3 with an address specifying the given pixel, reads an intensity value already drawn out of the frame buffer 3 at the address, and writes the old intensity value into the memory 7.

The comparator 8 compares the new and old intensity values stored in the memories 6 and 7 with each other. Only when the new intensity value is brighter than the old one, the comparator 8 activates the write signal WR. This signal activates the tri-state buffer 9 to write the new intensity value into the frame buffer 3.

If the old intensity value is brighter than new intensity value, the comparator 8 never activates the write signal WR. In this case, the tri-state buffer 9 is inactive, and therefore, the new intensity value is not written into the frame buffer 3. These processes are repeated until the straight line is completely drawn.

The embodiment will be explained in more detail with reference to FIG. 5. The line TB is drawn after the line TA, and a shaded pixel B3" of the line TB is identical to a shaded pixel A2' of the line TA. If an intensity value assigned to the pixel B3" is darker than that assigned to the pixel A2', the straight lines will provide unnatural images. Accordingly, before plotting the pixel B3", the intensity value of the pixel A2', is read and is compared with that of the pixel B3". If the pixel B3" is brighter than the pixel A2', the pixel B3" is plotted with the assigned intensity value, and if the pixel A2', is brighter than the pixel B3", the pixel B3" is not plotted. In this way, the embodiment compares a new intensity value to be assigned to a given pixel with an old intensity value already assigned to the given pixel, and only when the new intensity value is brighter than the other, plots the pixel with the new intensity value.

Figure 1:
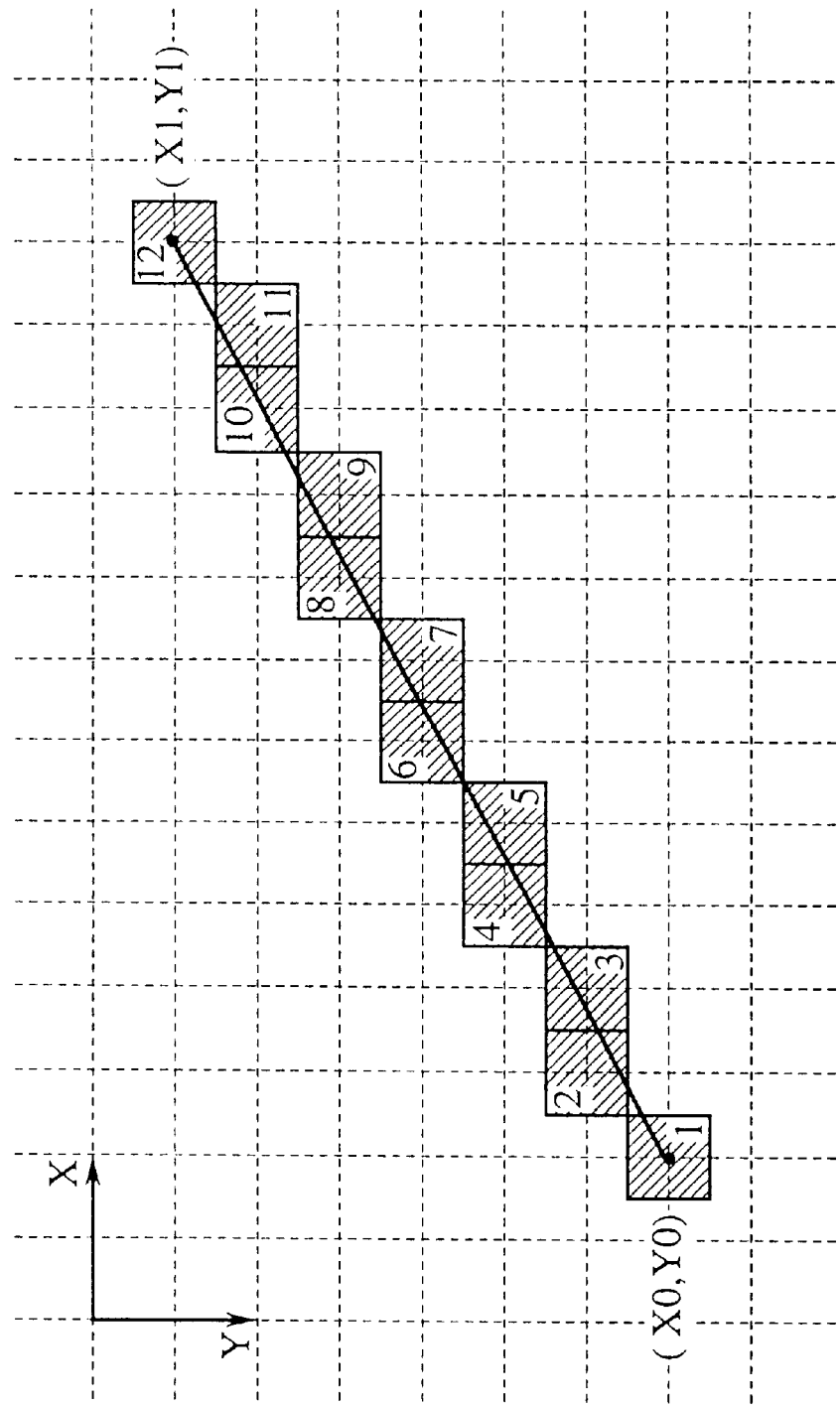
FIG. 1 shows a straight line generated by a digital differential analyzer (DDA)
Figure 4:
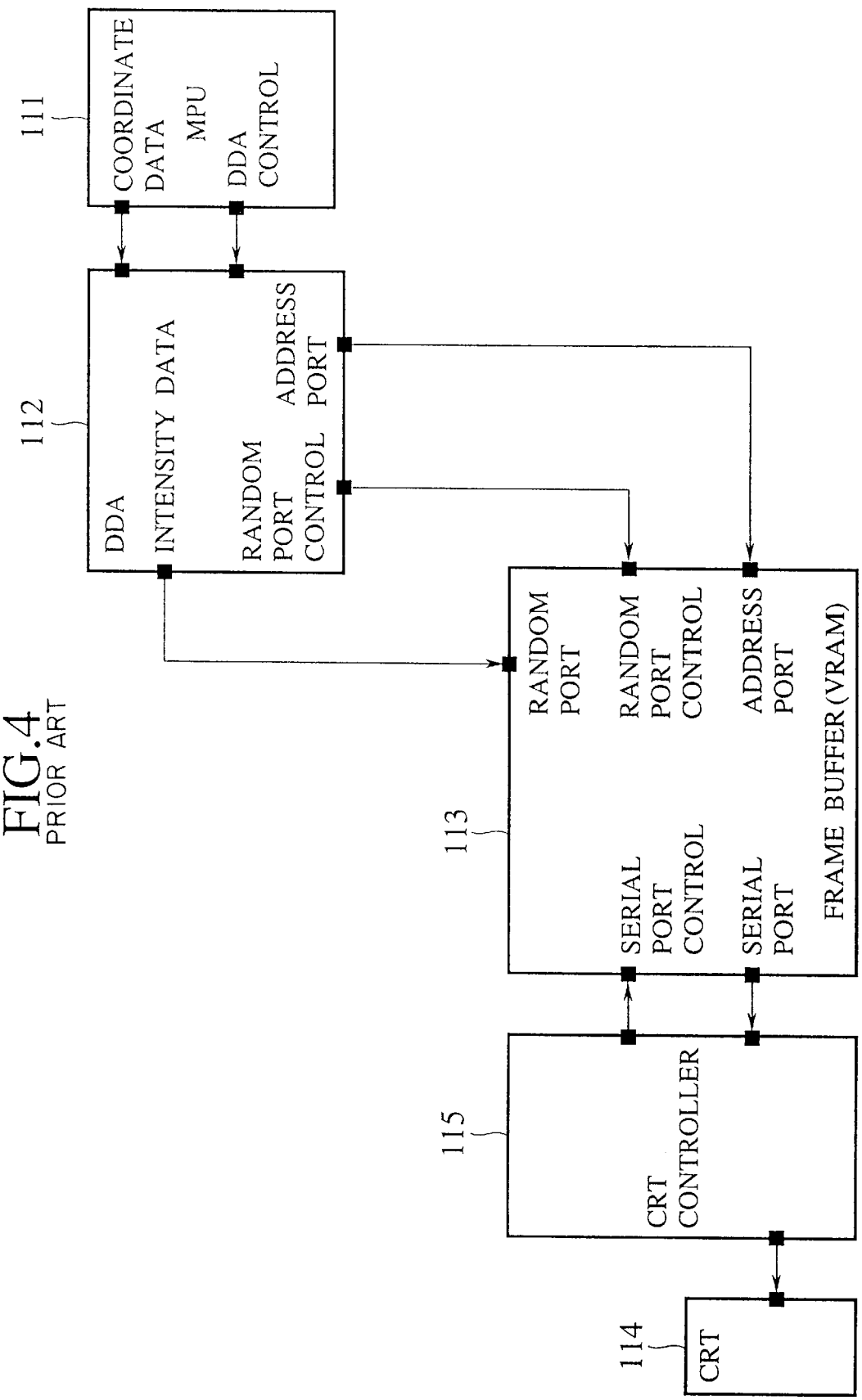
FIG. 4 shows a data processor according to a prior art.
Figure 5:
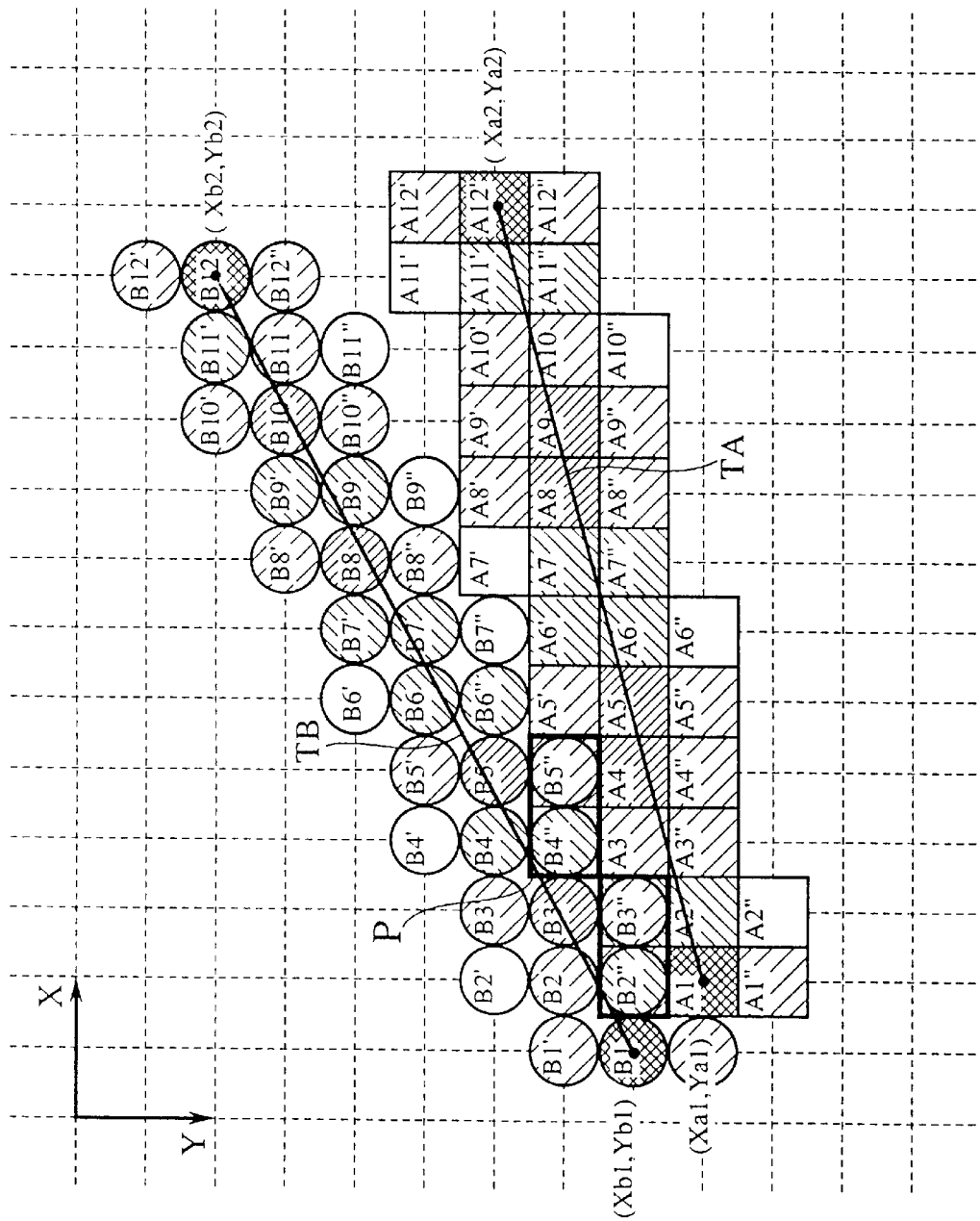
FIG. 5 shows straight lines drawn close to each other with antialiasing.

In consequence, the embodiment carries out antialiasing on a plurality of straight lines by always plotting brighter pixels so that the straight lines all provide natural images even if the lines are close to each other or cross each other as shown in FIG. 5.

Figure 9:
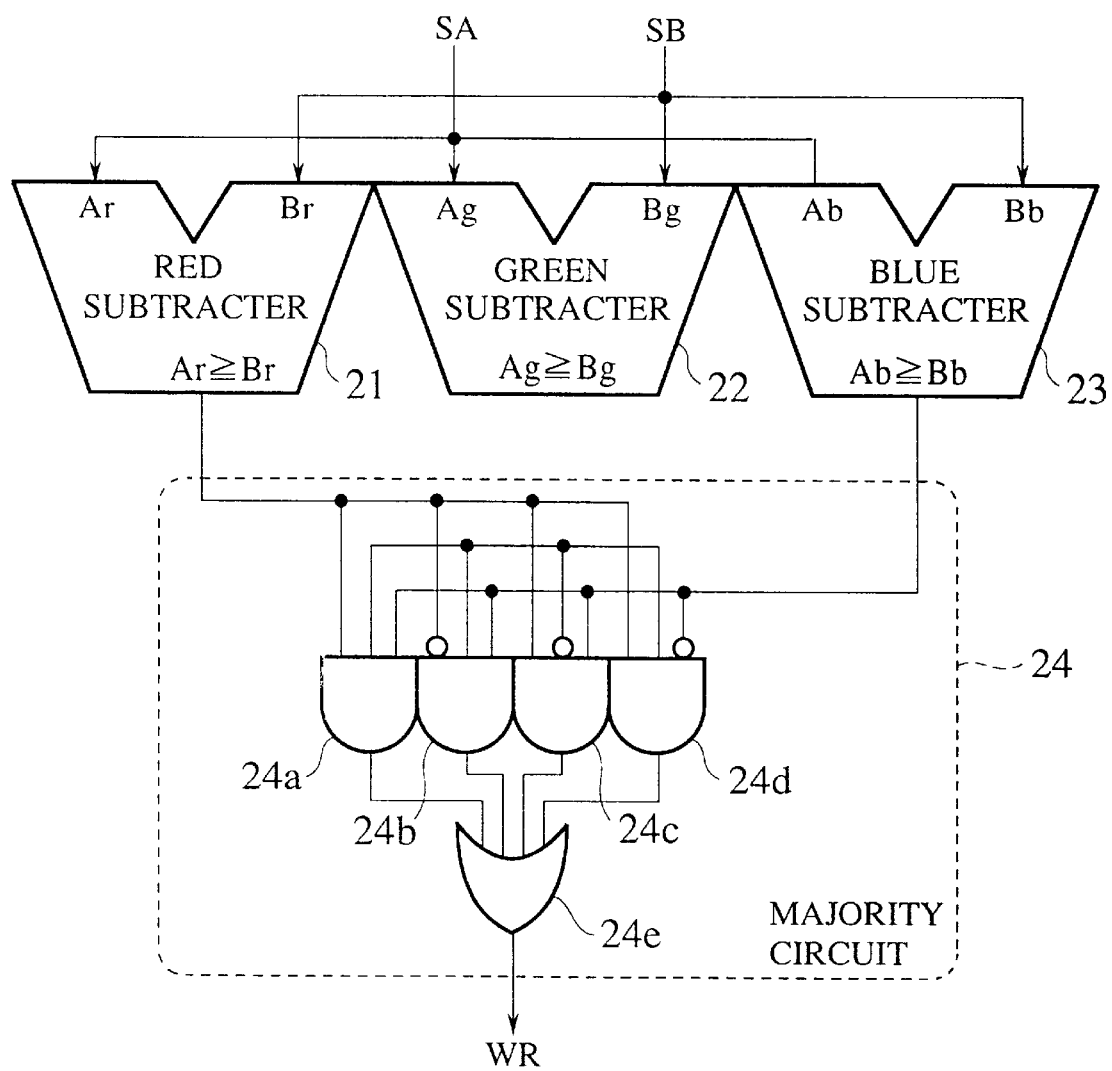
FIG. 9 shows another example of the comparator 8 of FIG. 6.

FIG. 9 shows another example of the comparator 8 of FIG. 6.

The comparator 8 of FIG. 6 is for gray scales. On the other hand, the comparator of FIG. 9 is for red (R), green (G), and blue (B) colors.

Namely, the comparator 8 of FIG. 9 consists of subtracters 21, 22, and 23 for R, G, and B, respectively. Comparison results provided by the subtracters 21 to 23 are tested by a majority circuit 24, which activates or inactivates the write signal WR accordingly. Input terminals Ar, Ag, and Ab of the subtracters 21 to 23 receive an intensity value SA from the memory 6, and the other terminals Br, Bg, and Bb thereof receive an intensity value SB from the memory 7.

The subtracter 21 compares the inputs Ar and Br with each other, provides "1" if Ar>=Br, and provides "0" if Ar<Br. The subtracter 22 compares the inputs Ag and Bg with each other, provides "1" if Ag>=Bg, and provides "0" if Ag<Bg. The subtracter 23 compares the inputs Ab and Bb with each other, provides "1" if Ab>=Bb, and provides "0" if Ab<Bb.

The majority circuit 24 consists of 3-input AND gates 24a, 24b, 24c, and 24d, and a 4-input OR gate 24e connected to output terminals of these AND gates. One input of each of the AND gates 24b, 24c, and 24d is active, i.e., low. An output terminal of the OR gate 24e provides the write signal WR.

Only by replacing the comparator 8 of FIG. 6 with the comparator 8 of FIG. 9, a data processor for handling R, G, and B data is realized.

Figure 10:
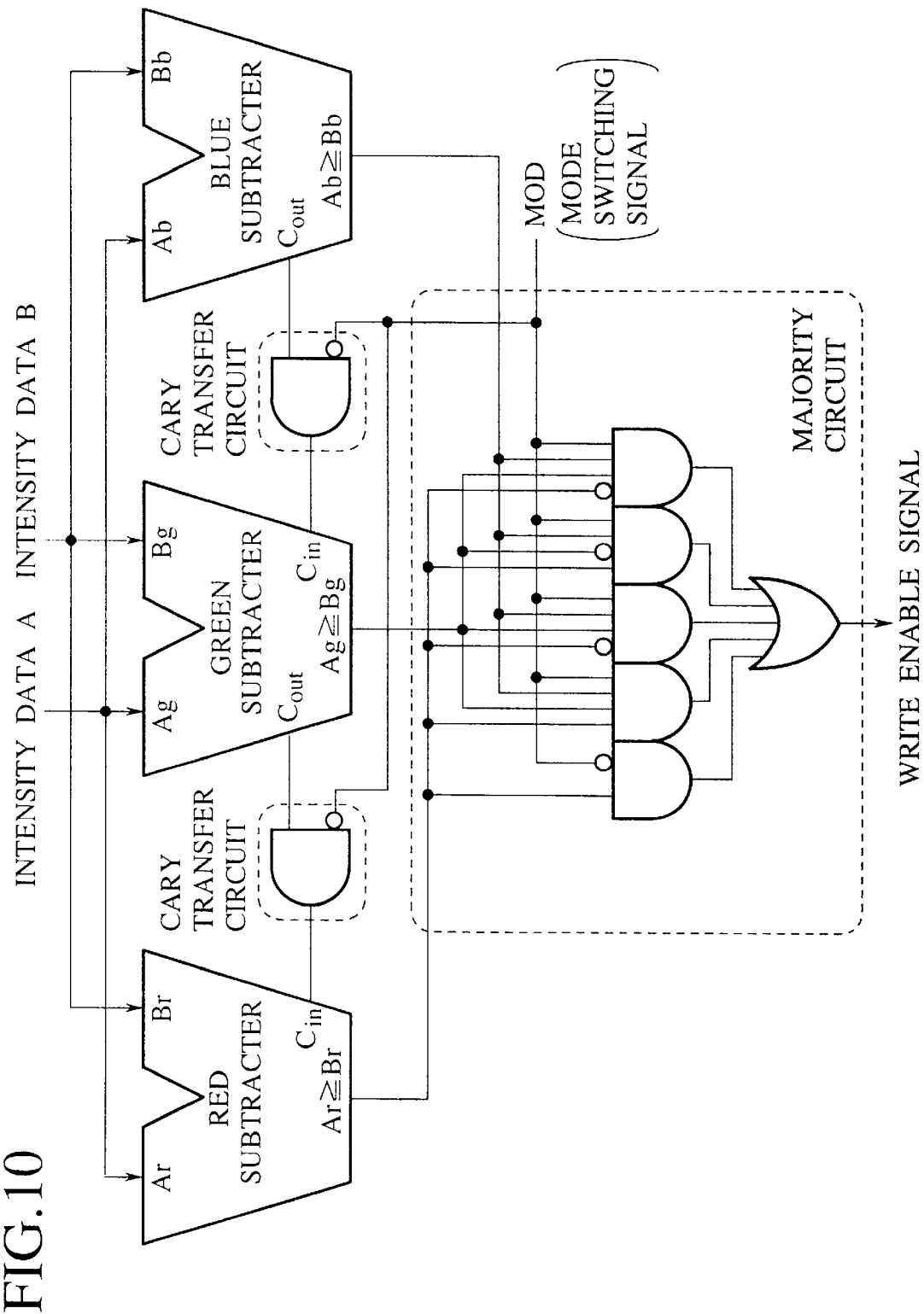
FIG. 10 shows still another example of the comparator 8 of FIG. 6.

FIG. 10 shows still another example of the comparator 8 of FIG. 6.

The comparator 8 of FIG. 10 is capable of handling gray scales as well as R, G, and B colors. A majority circuit of this comparator consists of four 4-input AND gates, a 2-input AND gate, and a 5-input OR gate. Three subtracters of the comparator must operate as a single subtracter as well. For this purpose, each subtracter is provided with terminals Cin and/or Cout to transfer a carry. Transferring a carry is controlled by additional AND gates. A mode switching signal MOD is supplied to the AND gates of the subtracters and majority circuit, to switch gray-scale and color modes from one to another. The signal MOD is "1" to achieve the color mode and "0" to achieve the gray-scale mode. The signal MOD is generated by the DDA 2 or MPU 1.

Only by replacing the comparator 8 of FIG. 6 with that of FIG. 10, a data processor for handling colors as well as gray scales is realized.

Figure 11:
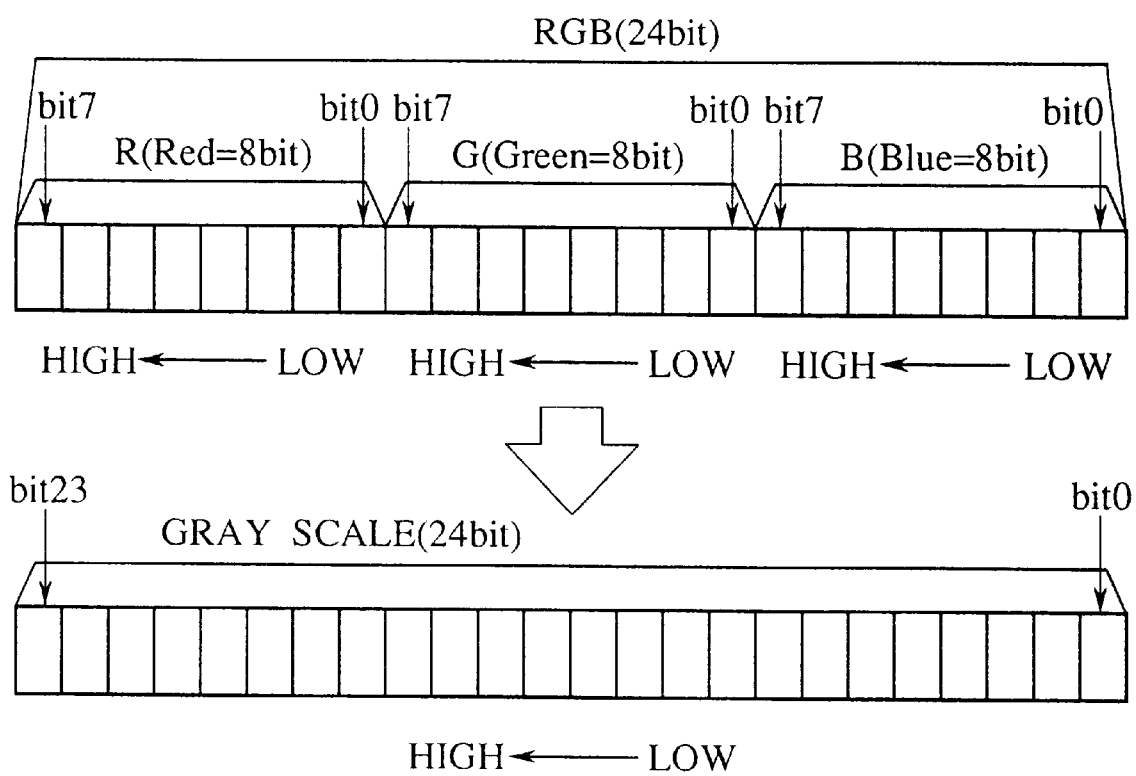
FIG. 11 shows a relationship between R, G, and B data and gray-scale data based on the example of FIG. 10.

FIG. 11 shows a relationship between R, G, and B colors and gray scales for a data processor that is capable of handling both of them. Namely, gray scales and R, G, and B colors employ 24 bits. In the case of R, G, and B colors, each of them is represented with eight bits. In the case of gray scales, a bit 23 is the most significant bit. In the case of R, G, and B colors, R is on the higher bit side, and G and B follow the same.

Figure 12:
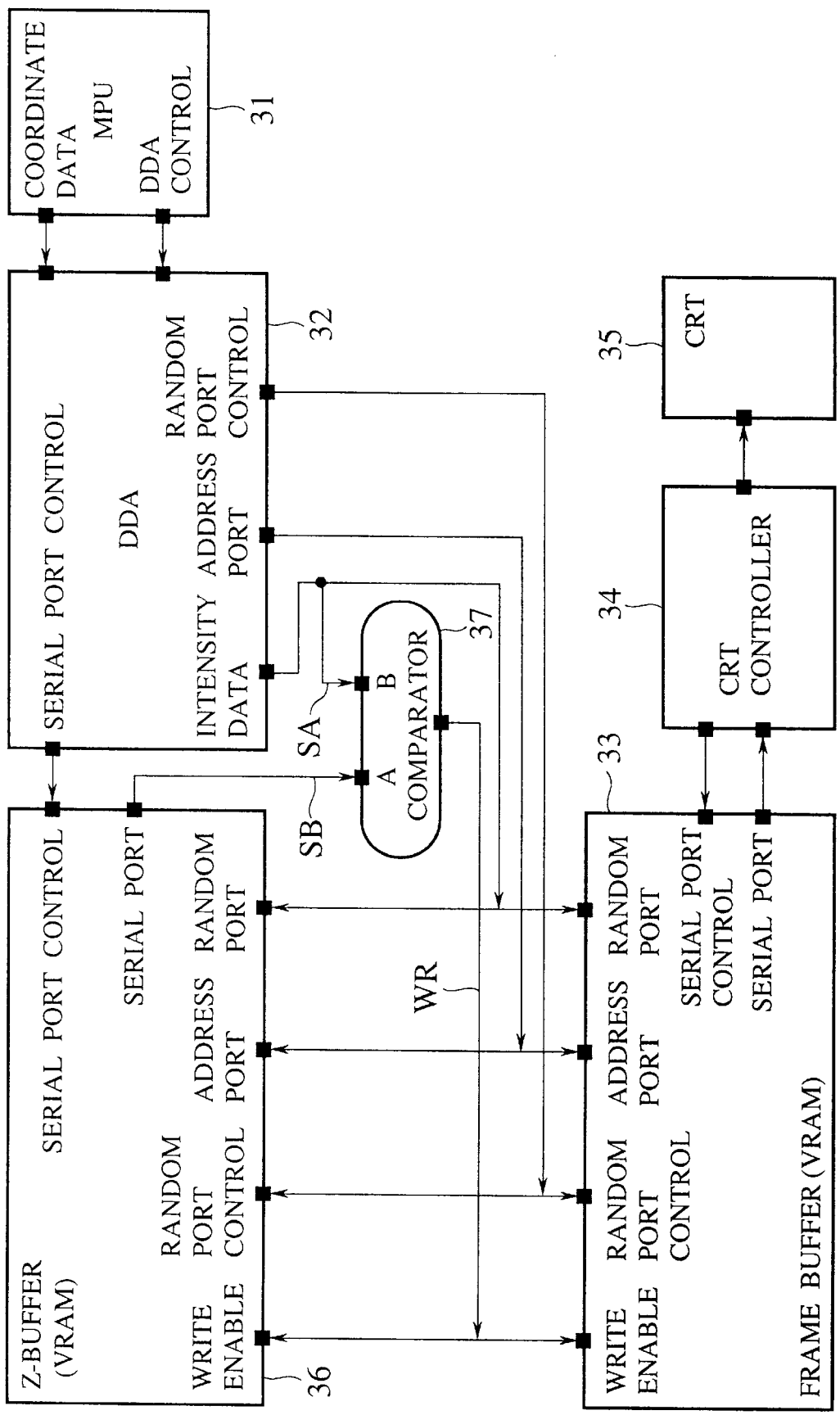
FIG. 12 shows the basic structure of a data processor according to a second embodiment of the present invention.

FIG. 12 shows the basic structure of a data processor according to the second embodiment of the present invention.

This embodiment employs a three-dimensional graphic LSI chip to carry out the same algorithm as that of the first embodiment for antialiasing on straight lines.

The data processor of FIG. 12 has an MPU 31, a DDA 32, a frame buffer 33, a CRT controller 34, and a CRT 35. These correspond to the MPU 1, DDA 2, frame buffer 3, CRT controller 4, and CRT 5 of the first embodiment. In addition, the second embodiment employs a Z-buffer 36 for three-dimensional graphics and a comparator 37 for comparing new and old intensity values of a given pixel with each other.

The Z-buffer 36 serves as a work memory for storing the same data as those stored in the frame buffer 33. Namely, an address port of the DDA 32 is connected to address ports of the buffers 33 and 36, a random port control terminal of the DDA 32 is connected to random port control terminals of the buffers 33 and 36, and an intensity value terminal of the DDA 32 is connected to random ports of the buffers 33 and 36.

A serial port control terminal of the DDA 32 is connected to a serial port control terminal of the Z-buffer 36. A serial port of the Z-buffer 36 is connected to an input terminal of the comparator 37. The other input terminal of the comparator 37 is connected to the intensity value terminal of the DDA 32. An output terminal of the comparator 37 is connected to write enable terminals of the buffers 33 and 36.

The second embodiment is easily realized only by adding the comparator 37 to a conventional threedimensional graphics system.

The operation of the second embodiment will be explained.

The MPU 31 provides the DDA 32 with the coordinates of start and end points of a straight line to draw with a drawing start signal. Upon receiving them, the DDA 32 generates pixel data. The DDA 32 first generates the address of each pixel to plot and provides it to the frame buffer 33 and Z-buffer 36.

Then, the Z-buffer 36 provides, through the serial port thereof, an old intensity value stored at the address of the pixel in question to one input terminal of the comparator 37. At this time, the DDA 32 provides the other input terminal of the comparator 37 with a new intensity value to be assigned to the pixel in question. The comparator 37 compares the new and old intensity values with each other.

If the new intensity value is brighter than the old one, the comparator 37 activates the write signal WR to write the new intensity value into the frame buffer 33 and Z-buffer 36 each at the address of the pixel in question. If the old intensity value is brighter than the new one, the comparator 37 inactivates the write signal WR to write nothing in the frame buffer 33 and Z-buffer 36 at the address of the pixel in question. In this way, the straight line is drawn.

The second embodiment uses the Z-buffer 36 as a work memory for storing the same data as those stored in the frame buffer 33. This is to quickly read an old intensity value for a given pixel and quickly compare it with a new intensity value to be assigned to the pixel.

Unlike the first embodiment that temporarily stores an old intensity value in the memory 7, the second embodiment directly provides the old intensity value to the comparator 37, which provides the write signal WR. Accordingly, the second embodiment realizes a faster speed operation than the first embodiment.

The second embodiment may employ the comparator of FIG. 9 to handle color data, or the comparator of FIG. 10 to handle both color and gray-scale data.

The third embodiment of the present invention will be explained. Unlike the first and second embodiments that carry out antialiasing with the use of three pixels for each point of a line to draw, the third embodiment carry out antialiasing with the use of two pixels for each point of a line to draw according to a different algorithm executed by a digital differential analyzer (DDA).

FIG. 13 shows a C-language-like description of the algorithm for plotting two pixels for each point of a line to draw.

This example draws a straight line from coordinates (X0, Y0) to coordinates (X1, Y1) with an intensity value of I0. The intensity value of a given pixel is expressed with a function f of dM, dx, dy, etc., where the function f is dependent on antialiasing conditions. In this example, an intensity value I is calculated as "I0*f(dM, Y)." Step S31 starts to draw a straight line with antialiasing. Step S32 sets a variation dx as "X1-X0." Step S33 sets a variation dy as "Y1-Y0." Step S34 sets a unit variation delta-Y as "dy/dx." Step S35 sets an initial coordinate of X as X0. Step S36 sets an initial coordinate of Y as Y0. Step S37 sets an initial value of 0.5 for a distance dM from a pixel center to the center of the straight line. Step S38 sets an intensity I for each pixel as I0.

Then, the straight line is generated. Step S39 increments X from X0 to X1. During this incremental operation, antialiasing with two pixels per point is carried out. Namely, if dM is positive in step S40, steps S41 and S42 plot pixels at coordinates (X, Y) and (X, Y+1). If dM is negative in step S43, steps S44 and S45 plot pixels at coordinates (X, Y) and (X, Y-1). Step S46 accumulates delta-Y. Step S47 checks to see if dM>1. If dM>1, step S48 increments Y by +1, and step S49 resets dM.

In this way, dM indicates a distance to the straight line. If dM>=0, the pixel in question and an upper pixel are drawn. If dM<0, the pixel in question and a lower pixel are drawn. The intensity value of a given pixel is determined according to dM. Namely, the straight line has a width, and dM is the pixel occupation ratio of the straight line.

FIG. 14A shows an example of a straight line TA drawn according to the third embodiment. Each pixel of the straight line TA is represented with a square as shown in FIG. 14B. The intensity value of each pixel is any one of five levels as shown in FIG. 14C. The pixels are drawn in order of numbers depicted in the squares of FIG. 14A. Pixels having the same number with or without a quotation mark are simultaneously drawn. For example, pixels 1 and 1' are simultaneously drawn.

Drawing a straight line according to the antialiasing using two pixels per point is achievable with the structure of any one of FIGS. 6 and 12 with a small change in the algorithm carried out by the DDA 2. In the two-pixel antialiasing, the present invention always draws a brighter one of pixels that overlap each other when straight lines are drawn to be close to each other or cross each other, to provide natural images of the straight lines.

Although the embodiments mentioned above relate to drawing straight lines, the apparatuses and methods of the present invention are applicable to drawing curves. In this case, the curves are drawn according to spline functions instead of the algorithm of FIG. 8 that handles straight lines. Approximation of a curve according to a wire frame model is equivalent to connecting straight segments to one another. If the segments form intersections, antialiasing may be applied thereto according to the present invention without special amendments.

As explained above, the present invention correctly carries out antialiasing on a plurality of lines even if the lines are close to each other or cross each other, thereby providing natural images of the lines. The present invention is capable of directly comparing new and old intensity values with each other in a comparator, to improve a processing speed.

What is claimed is:

1. A data processor comprising:
   storage means for storing a bitmap of a figure to be displayed on display means;
   data generation means for generating, according to antialiasing conditions, data of every pixel to draw the figure, the data including an address to specify the pixel and one of intensity and color values to be assigned as a new value to the pixel;
   read means for reading, as an old value, one of intensity and color values that corresponds to the new value and has already been assigned to the pixel, out of said storage means at the address of the pixel;
   comparison means for comparing the new value with the old value, and only when the new value is greater than the old one, providing a write signal; and
   write means for writing, only when said comparison means provides the write signal, the new value into said storage means at the address of the pixel.

2. The data processor as claimed in claim 1, wherein said data generation means generates addresses and new intensity or color values for vertical or horizontal three pixels at a time to draw the figure, the new values being adjusted according to antialiasing conditions.

3. The data processor as claimed in claim 1, wherein said data generation means generates addresses and new intensity or color values for vertical or horizontal two pixels at a time to draw the figure, the new values being adjusted according to antialiasing conditions.

4. A data processor comprising:
   storage means for storing a bitmap of a figure to be displayed on display means;
   intensity/color value generation means for generating data of every pixel to draw the figure, the data including an address to specify the pixel and one of intensity and color values to be assigned as a new value to the pixel;
   draw means for drawing the new value in said storage means at the address of the pixel;
   change means for changing the new value to be drawn by said draw means according to antialiasing conditions;
   read means for reading, as an old value, one of intensity and color values that corresponds to the changed new value and has already been assigned to the pixel, out of said storage means at the address of the pixel;
   comparison means for comparing the changed new value with the old value, and only when the changed new value is greater than the old one, providing a write signal; and
   write means for writing, only when said comparison means provides the write signal, the changed new value into said storage means at the address of the pixel.

5. A data processor comprising:
   storage means for storing a bitmap of a figure to be displayed on display means;
   intensity/color value generation means for generating data of every pixel to draw the figure, the data including an address to specify the pixel and one of intensity and color values to be assigned as a new value to the pixel, and draw means for drawing the new value in said storage means at the address of the pixel;
   change means for changing the new value to be drawn by said draw means according to antialiasing conditions;

first memory means for storing the changed new value;

second memory means for storing an old value that corresponds to the changed new value, has already been assigned to the pixel, and read out of said storage means at the address of the pixel;

comparison means for comparing the changed new value in said first memory means with the old value in said second memory means, and only when the changed new value is greater than the old value, providing a write signal; and write means for writing, only when said comparison means provides the write signal, the changed new value into said storage means at the address of the pixel.

6. The data processor as claimed in claim 4, wherein said comparison means compares, for each pixel, new and old color values with each other and has:

first, second, and third comparators for comparing new and old red, green, and blue values, respectively, with each other; and a majority circuit for generating the write signal according to a majority of comparison results provided by the first, second, and third comparators.

7. The data processor as claimed in claim 4, wherein said intensity/color value generation means generates addresses and new intensity or color values for vertical or horizontal three pixels at a time to draw the figure.

8. The data processor as claimed in claim 4, wherein said intensity/color value generation means generates addresses and new intensity or color values for vertical or horizontal two pixels at a time to draw the figure.

9. A data processing method comprising the steps of:

generating data of every pixel necessary to draw a straight line according to antialiasing conditions; and drawing the straight line according to the generated data, any pixel existing at an intersection, if the straight line crosses another line, being drawn with a maximum one of intensity or color values assigned to the pixel.

10. A data processing method comprising the steps of:

generating data of every pixel necessary to draw a curve according to antialiasing conditions; and drawing the curve according to the generated data, any pixel existing at an intersection, if the curve crosses another line, being drawn with a maximum one of intensity or color values assigned to the pixel.

11. A data processing method comprising the steps of:

drawing a first line according to antialiasing conditions; and drawing a second line according to the antialiasing conditions so that the second line is close to or cross the first line, any pixel of the second line that overlaps a pixel of the first line being not drawn if the pixel of the second line has a lower intensity or color value than the pixel of the first line.

\* \* \* \* \*